United States Patent [19]

Mimura et al.

[11] Patent Number: 4,960,182
[45] Date of Patent: Oct. 2, 1990

[54] CONSTANT SPEED HOLDING APPARATUS

[75] Inventors: Munehiko Mimura; Takumi Tatumi; Yasuo Naito; Kazuyori Katayama, all of Himeji, Japan

[73] Assignee: Mitsubishi Denki Kabushiki Kaisha, Tokyo, Japan

[21] Appl. No.: 213,054

[22] Filed: Jun. 29, 1988

[30] Foreign Application Priority Data

Jul. 2, 1987 [JP] Japan ................. 62-167177

[51] Int. Cl.$^5$ .............................. B60K 31/04
[52] U.S. Cl. .................... 180/179; 180/170; 364/424.06
[58] Field of Search ............... 180/170, 176, 177, 178, 180/179; 364/424.01, 426.04

[56] References Cited

U.S. PATENT DOCUMENTS

| 4,445,329 | 5/1984 | Drisko | 180/170 |
| 4,484,279 | 11/1984 | Muto | 364/426.04 |

FOREIGN PATENT DOCUMENTS

| 123083 | 10/1984 | European Pat. Off. . | |
| 139277 | 5/1985 | European Pat. Off. . | |
| 2123803 | 11/1971 | Fed. Rep. of Germany | 180/170 |
| 58-29018 | 2/1983 | Japan . | |
| 58-39311 | 3/1983 | Japan . | |
| 60-135335 | 7/1985 | Japan . | |
| 171618 | 8/1986 | Japan . | |
| JP87631 | 2/1988 | PCT Int'l Appl. . | |

*Primary Examiner*—Charles A. Marmor
*Assistant Examiner*—Eric Culbreth
*Attorney, Agent, or Firm*—Sughrue, Mion, Zinn, Macpeak & Seas

[57] ABSTRACT

A constant speed holding apparatus for maintaining constant vehicle speed by both variable speed control and throttle control, when setting the vehicle speed, wherein, upon detection of a point of time at which set vehicle speed is stored or a specified period of time thereafter, correction is made so that the variable speed ratio at the time immediately prior to the detection is taken as a target variable speed ratio, whereby any possible trouble of overshoot and undershoot with the vehicle speed at the time of speed setting or at a point of time thereafter is prevented so that stable cruise of the vehicle at constant speed is made possible.

4 Claims, 6 Drawing Sheets

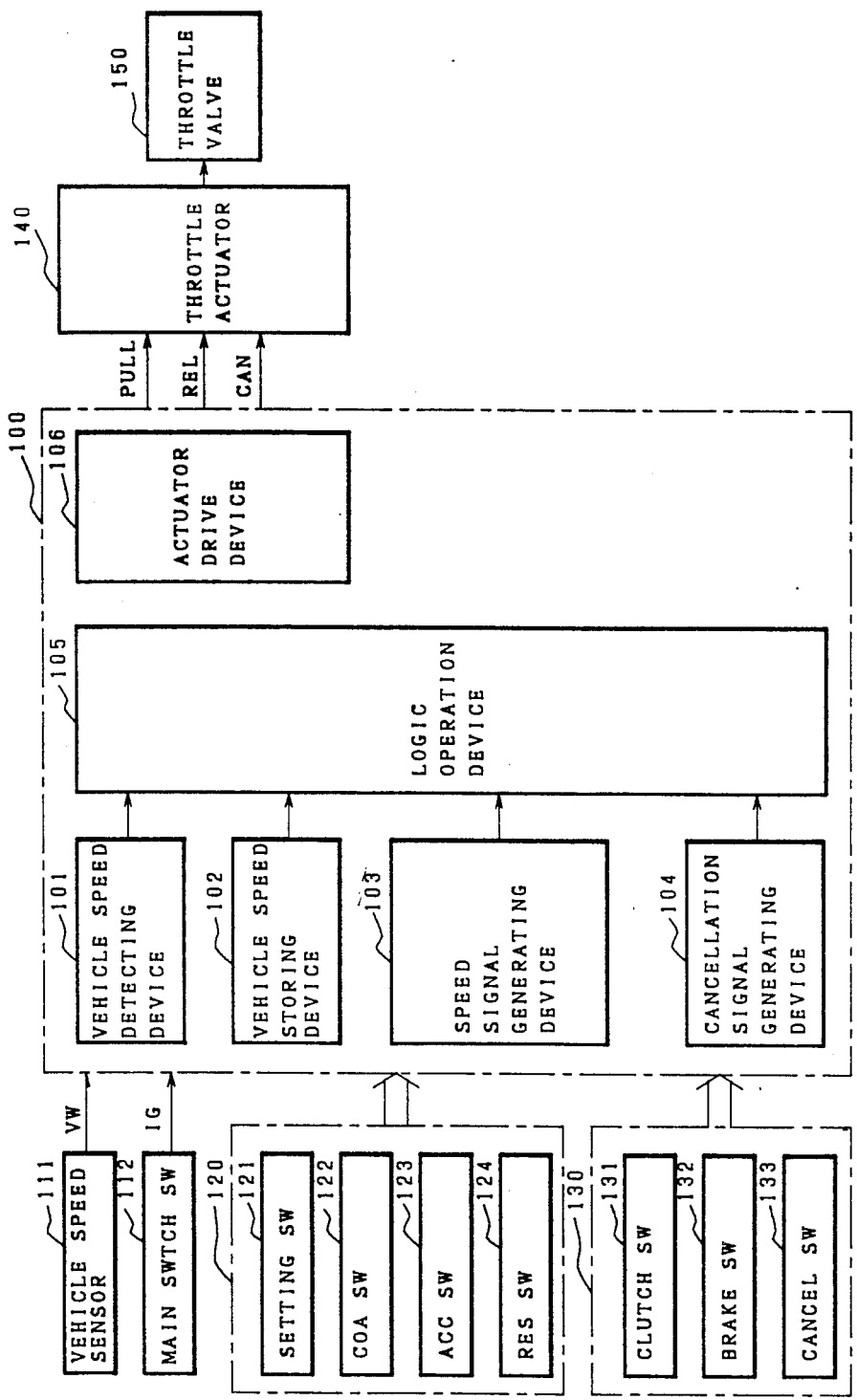
Fig. 1 (a) Prior Art

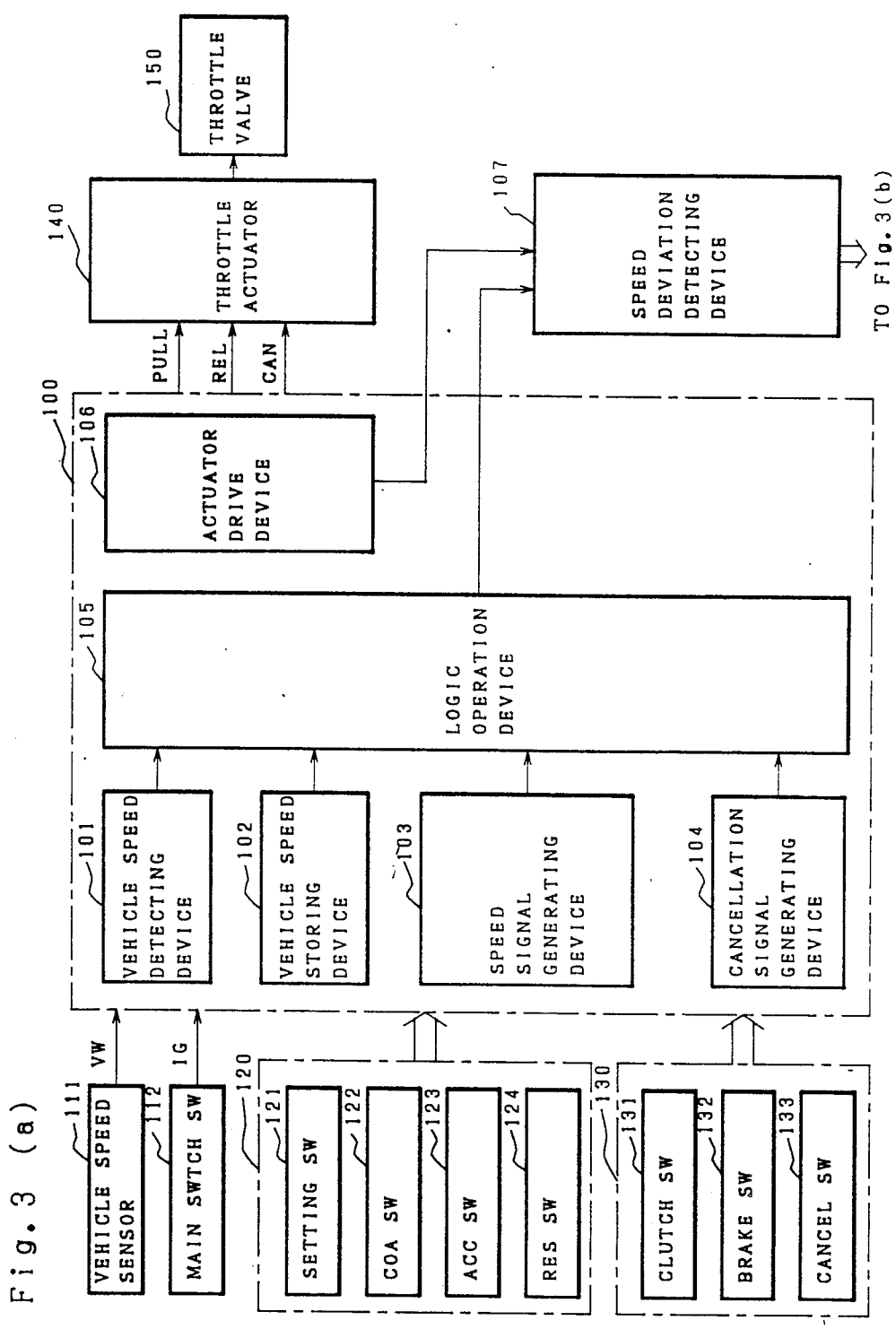

CONSTANT SPEED HOLDING APPARATUS

BACKGROUND OF THE INVENTION

1. Field of the Invention

This invention relates to a constant speed holding apparatus for keeping the cruise of a vehicle at a constant speed and, more particularly, to a constant speed holding apparatus for keeping a constant speed cruise of the vehicle through both variable speed ratio control and throttle control.

2. Description of the Prior Art

The conventional constant speed holding apparatuses of this type are shown, for example, in Japanese Provisional Patent Publication Nos. 135335/1985; 39311/1983; and 29018/1983. Also, one such apparatus is described in the specification of PCT/JP87/00631, a PCT application filed by same person as the present applicant.

A block diagram is given in FIG. 1 which illustrates the arrangement of these prior art apparatuses in a summarized form.

Referring to FIG. 1, the numeral 100 designates a constant speed cruise control unit, which comprises a vehicle speed detecting device 101, a vehicle speed memory device 102, a speed signal generating device 103, a cancellation signal generating device 104, a logic operation device 105, and an actuator drive device 106.

This constant speed cruise control unit 100 goes into operation as it receives an ignition signal IG from a main switch, and an actual vehicle speed value $V_W$ is inputted from a vehicle speed sensor 111 to the control unit 100, said actual vehicle speed $V_W$ being then detected by the vehicle speed detecting device 101. The detected actual speed value is outputted to the logic operation device 105, which also receives relevant data from the vehicle speed memory device 102. In the memory device 102 there is stored a preset vehicle speed or a target vehicle speed set by the driver.

The numeral 120 designates a group of command switches which are cruise condition detecting means, i.e., switches for cruise condition setting by the driver. They include a set switch 121, a COA switch 122, an ACC switch 123, and an RES switch 124.

The set switch 121 is a command switch which stores a present vehicle speed as a set vehicle speed and controls the cruise speed of the vehicle thereafter on the basis of the stored set speed.

The COA switch 122 is a command switch for use in reducing the set vehicle speed to a level below the existing vehicle speed.

The ACC switch 123 is a command switch for use in increasing the set vehicle speed to a level above the existing vehicle speed, which performs acceleration control to provide better acceleration feeling.

The RES switch 124 is a command switch for providing an accelerated or decelerated cruise condition or a constant speed cruise condition on the basis of a previously stored set vehicle speed as a target value.

The output of each of the group of command switches 120 is sent to the speed signal generating device 103 of the constant speed cruise control unit 100.

The speed signal generating device 103, as it receives the output of each of the command switches 120, generates a corresponding desired speed signal and outputs the same to the logic operation device 105.

The numeral 130 designates a group of cancellation switches as means for detecting conditions for cancellation. The cancellation switches 130 include a clutch switch 131, a brake switch 132, and a cancel switch 133. The cancellation switches 130 are for canceling the existing state of constant speed cruise control by the manipulation of a driver, the output of the switches 130 being sent to the cancellation signal generating device 104 of the constant speed cruise control unit 100.

It is generally known that both the cancellation switches 130 and the command switches 120 can be arranged in various ways according to the types of the vehicles in which they are mounted, but their basic roles are essentially same in all cases.

The logic operation device 105 in the constant speed cruise control unit 100 performs a specified logic operation on the basis of the outputs from the vehicle speed detecting device 101, the vehicle speed memory device 102, the speed signal generating device 103, and the cancellation signal generating device 104, to control the the actuator drive device 106, thereby to drive a throttle actuator 140, through which the opening of a throttle value 150 is controlled to permit constant speed cruise of the vehicle at the set vehicle speed.

A continuous variable transmission 250 includes pulleys disposed at its input and output sides and a V-belt, each of the pulleys being hydraulically variable in P. C. D so that the transmission 250 is variable in variable-speed ratio.

A continuous variable transmission control unit 200 consists of a regulating hydraulic pressure generating device 201, a variable speed hydraulic pressure generating device 202, and a CVT (continuous variable transmission) actuator drive device 203 as continuous variable transmission regulating means.

The continuous variable transmission control unit 200 receives outputs of various vehicle cruise information detecting devices including an input rotation angle sensor 211 and an output rotation angle sensor 212, both for detecting an actual variable speed ratio, a range position sensor 213 for drawing such cruise performance as desired by the driver, a throttle opening sensor 214 for detecting necessary throttle opening for meeting the driver's acceleration requirements, an engine-control information detecting device 220 for detecting information necessary for determining the condition of the engine, and a vehicle cruise control information detecting device 230 for detecting information necessary for vehicle cruise, and accordingly drives a regulating hydraulic pressure actuator 240 for regulating the hydraulic pressure from the output-side pulley of the continuous variable transmission correspondingly to the transmission power of the engine and a variable-speed hydraulic pressure actuator 241 for controlling the hydraulic pressure from the input-side pulley of the continuous variable transmission correspondingly to the variable speed ratio.

The manner of operation will be explained.

FIG. 2 is a flow chart showing the sequence of operations of the continuous variable transmission control unit 200 disclosed in aforesaid Japanese Provisional Patent Publication No. 135335/1985.

In FIG. 2, a throttle opening data $\theta_{TH}$ from the throttle opening sensor 214, an input-side rotation speed data $N_I$ from the input rotation angle sensor 211, an output-side rotation speed data $N_O$ from the output rotation angle sensor 212, and a range position signal Sel from the range position sensor 213 are respectively read at step S401.

The next step S402 is a routine for deciding whether the variable speed ratio requires compensation or not. Such compensation requirement arises when the throttle opening $\theta_{TH}$ is either in non-open state in full open state. When such compensation requirement occurs, processing advances to step S410.

This step S410 is a processing routine for various kinds of compensation, at step S411 included in the step S410, according to the need arising at step 402 for compensation of the variable speed ratio, a target input shaft rotation speed $N_{IS}$ is calculated, and at step S412 a target variable speed ratio $R_S$ is calculated on the basis of the target input shaft rotation speed $N_{IS}$ and the present vehicle speed. After the target variable speed ratio $R_S$ is obtained, processing advances to step S404, at which variable speed ratio control is performed as will be described hereinafter.

Whilst, ordinary variable speed ratio control is performed at step S403, an engine characteristic routine, by calculating an engine-generated torque $\tau_e$ on the basis of the throttle opening $\theta_{TH}$ and the target input shaft rotation speed $N_{IS}$, both read at step S401, if the decision at step S402, the routine for deciding whether the variable speed ratio requires compensation or not, is that such compensation is unnecessary. For the purpose of this calculation a map is used.

Subsequently, at step S404, a routine for regulating hydraulic pressure calculation, regulating hydraulic pressure $P_L$ is calculated which is determined by engine-generated torque $\tau_e$ and actual variable speed ratio R, and the regulating hydraulic pressure actuator 240 is operated.

Then, at step S405, a routine for variable speed hydraulic pressure calculation, a variable speed hydraulic pressure $P_R$ is calculated which corresponds to the differential between the target input shaft rotation speed $N_{IS}$ and the actual input shaft rotation speed $N_I$, and the variable speed hydraulic pressure actuator 241 is driven.

In the processing routine shown in FIG. 2, it is so arranged that in case that the throttle is not fully opened by reason of insufficient negative pressure reduction when the vehicle is on an uphill road during its constant speed cruise, variable speed ratio control is performed for increasing the target variable speed ratio $R_S$ so that sufficient acceleration power can be obtained.

Similarly, in case that when the vehicle on a downhill road, actual vehicle speed $V_W$ tends to exceed the predetermined vehicle speed despite the fact that the throttle is totally closed, the target variable speed ratio $R_S$ is increased through a combination of throttle control and variable speed ratio control in order to enhance engine brake performance.

Now, the set vehicle speed is stored by operation of the group of command switches 120, such as set switch 121, after it is reached by the driver's acceleration control or otherwise. In the conventional constant speed holding apparatus, however, overshoot or undershoot is likely to occur depending upon the condition in which the driver accelerates vehicle. Especially when variable speed control is carried out, the trouble of overshoot or undershoot is more likely to occur in the conventional apparatus.

SUMMARY OF THE INVENTION

This invention is intended to solve aforesaid problem with the prior art, and accordingly it is a primary object of the invention to provide a constant speed holding apparatus of such arrangement that when a time at which a target vehicle speed value is stored through control of command switches or a specific period of time immediate thereafter is detected, it is possible to inhibit overshoot or undershoot of the vehicle speed at the time by taking immediately previous variable speed ratio as the target variable speed ratio, thereby to ensure stable cruise of the vehicle at constant speed. The above and further objects and features of the invention will more fully be apparent from the following detailed description with accompanying drawings.

DESCRIPTION OF THE PREFERRED EMBODIMENTS

Figure 3:
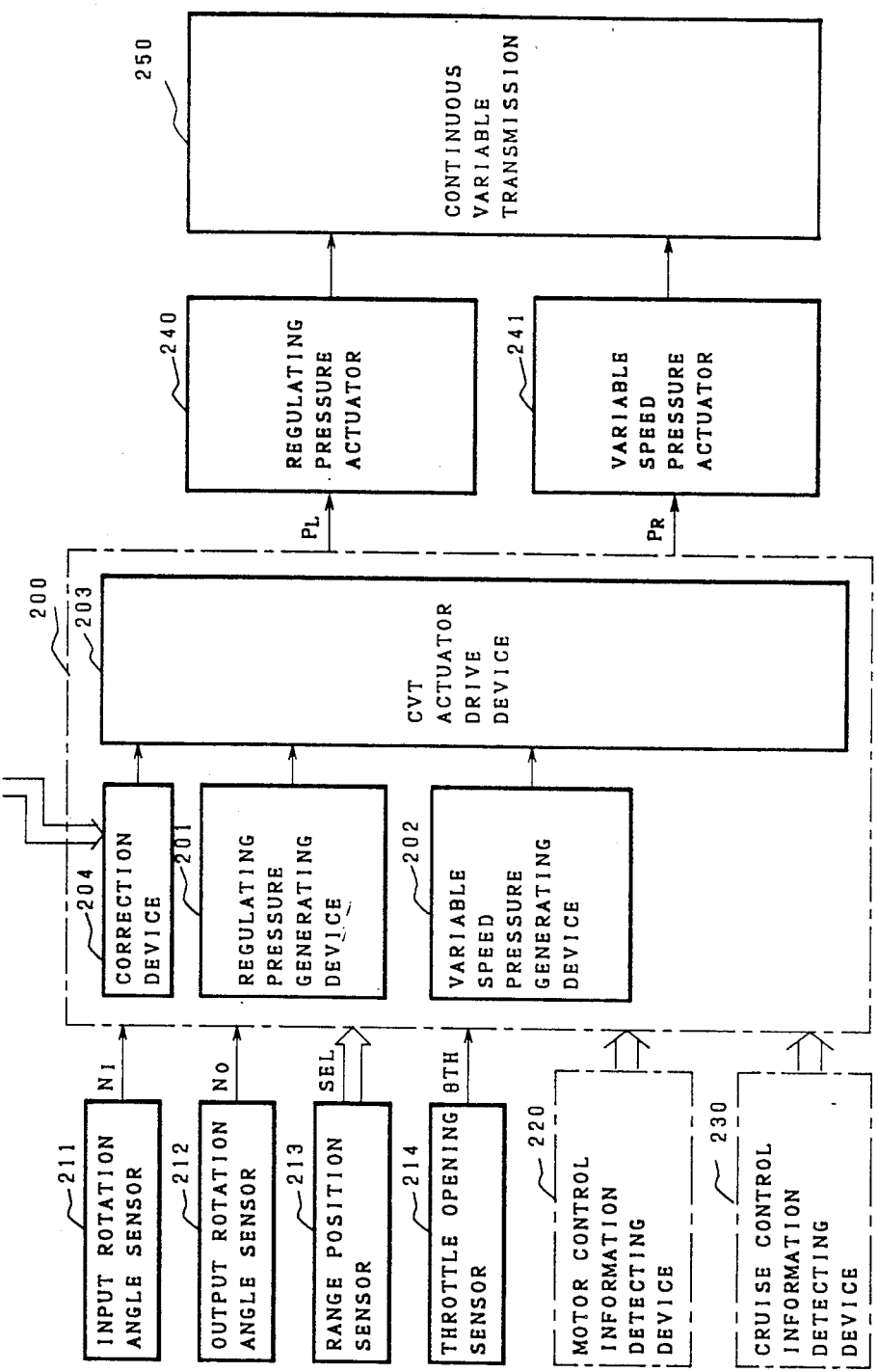
FIGS. 3(a) and 3(b), taken together, are a block diagram showing the arrangement of a constant speed holding apparatus according to the invention.

FIG. 3 is a block diagram showing the arrangement of the constant speed holding apparatus in accordance with the invention.

In FIG. 3, the numeral 100 designates a constant speed cruise control unit, which comprises a vehicle speed detecting device 101, a vehicle speed memory device 102, a speed signal generating device 103, a cancellation signal generating device 104, a logic operation device 105, an actuator drive device 106, and a conditions set time detecting device 107.

This constant speed cruise control unit 100 receives an actual vehicle speed signal $V_W$ from a vehicle speed sensor 111, the actual vehicle speed $V_W$ being then detected by the vehicle speed detecting device 101. The so detected actual speed value is outputted to the logic operation device 105, which also receives relevant data from the vehicle speed memory device 102. In the memory device 102 there is stored a preset vehicle speed value or a target vehicle speed value set by the driver.

The numeral 120 designates a group of command switches, i.e., switches for cruise condition setting by the driver. They include a set switch 121, a COA switch 122, an ACC switch 123, and an RES switch 124.

The set switch 121 is a command switch which stores a present vehicle speed as a set vehicle speed and controls the cruise speed of the vehicle thereafter on the basis of the stored set vehicle speed.

The COA switch 122 is a command switch for use in reducing the set vehicle speed to a level below the existing vehicle speed.

The ACC switch 123 is a command switch for use in increasing the set vehicle speed to a level above the existing vehicle speed, which performs acceleration control to provide better acceleration feeling.

The RES switch 124 is a command switch for providing an accelerated or decelerated cruise condition or a constant speed cruise condition on the basis of a previously stored set vehicle speed as a target value.

The output of each of the group of command switches 120 is sent to the speed signal generating device 103 of the constant speed cruise control unit 100.

The speed signal generating device 103, as it receives the output of each of the command switches 120, generates a corresponding speed signal and outputs the same to the logic operation device 105.

The numeral 130 designates a group of cancellation switches as means for detecting conditions for cancellation. The cancellation switches 130 include a clutch switch 131, a brake switch 132, and a cancel switch 133.

The cancellation switches 130 are for canceling the existing state of constant speed control by the manipulation of a driver, the output of the switches 130 being sent to the cancellation signal generating device 104 of the constant speed cruise control unit 100.

It is generally known that both the cancellation switches 130 and the command switches 120 can be arranged in various ways according to the types of the vehicles in which they are mounted, but their basic roles are essentially same in all cases.

The logic operation device 105 in the constant speed cruise control unit 100 performs a specified logic operation on the basis of the outputs from the vehicle speed detecting device 101, the vehicle speed memory device 102, the speed signal generating device 103, and the cancellation signal generating device 104, to control the actuator drive device 106, thereby to drive a throttle actuator 140, through which the opening of a throttle valve 150 is controlled to permit constant speed cruise of the vehicle at the set vehicle speed.

The conditions set time detecting device 107, which is the subject matter of the invention, receives the output of the logic operation device 105 and the output of the actuator drive device 106.

The conditions set time detecting device 107 is for detecting the time at which the set speed is stored in place by a set switch 121 or a specific period of time right thereafter in which the throttle opening is allowed to become stable. The output of conditions set time detecting device 107 is sent to a correction device 204 which will be described hereinafter.

A continuous variable transmission 250 includes pulleys disposed at its input and output sides and a V-belt, each of the pulleys being hydraulically variable in P. C. D so that the transmission 250 is variable in variable speed ratio.

A continuous variable transmission control unit 200 consists of a regulating hydraulic pressure generating device 201, a variable speed hydraulic pressure generating device 202, a CVT (continuous variable transmission) actuator drive device 203 as continuous variable transmission regulating means, and a correction device 204.

The continuous variable transmission control unit 200 receives outputs of various cruise information detecting devices including an input rotation angle sensor 211 and an output rotation angle sensor 212, both for detecting an actual variable speed ratio, and also of a range position sensor 213 for drawing such cruise performance as desired by the driver, a throttle opening sensor 214 for detecting necessary throttle opening for meeting the driver's acceleration requirements, an engine-control information detecting device 220 for detecting information necessary for determining the condition of the engine, and a vehicle cruise control information detecting device 230 for detecting information necessary for vehicle cruise, and accordingly drives a regulating hydraulic pressure actuator 240 for regulating the hydraulic pressure from the output-side pulley of the continuous variable transmission correspondingly to the transmission power of the engine and a variable speed hydraulic pressure actuator 241 for controlling the hydraulic pressure from the input-side pulley of the continuous variable transmission correspondingly to the variable speed ratio.

The correction device 204 performs variable speed ratio correction in order to maintain the variable speed ratio of the continuous variable transmission 250 when it receives the output of the conditions set time detecting device 107, that is, information of a time to set vehicle speed or a specific period of time immediate thereafter is detected.

Next, the manner of operation will be explained.

Figure 1:
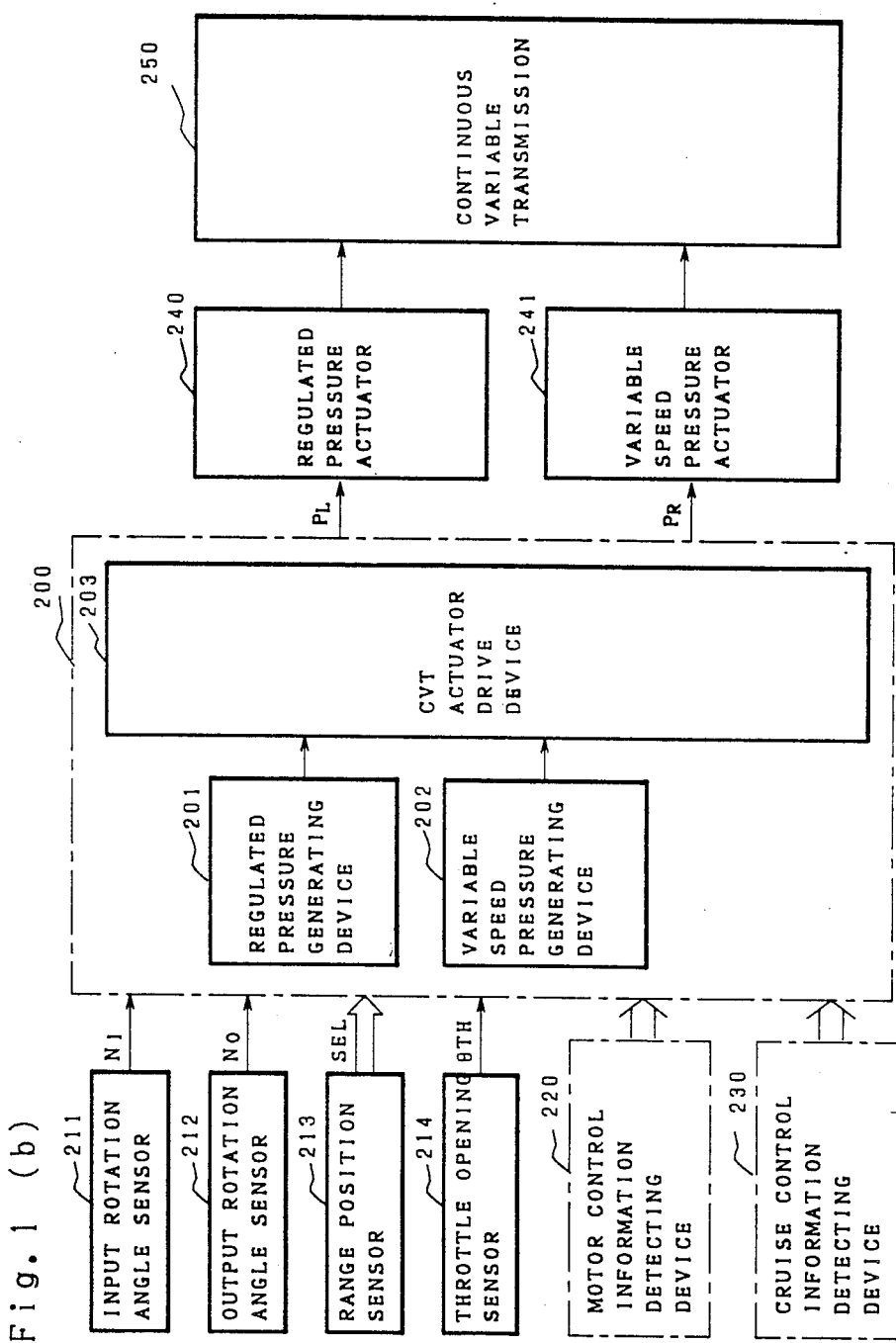
FIGS. 1(a) and 1(b), taken together, are a block diagram showing the arrangement of a conventional constant speed holding apparatus.
Figure 2:
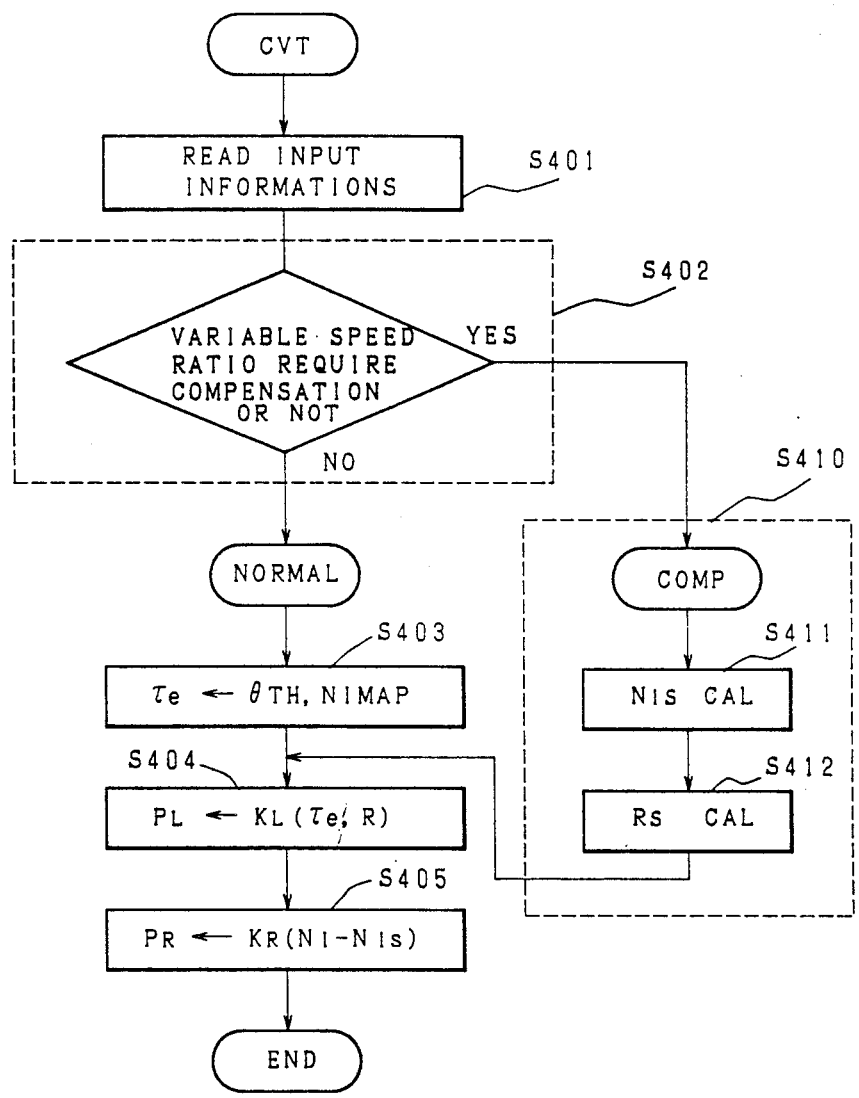
FIG. 2 is a flow chart illustrating the operation of a continuous variable transmission control unit of the conventional constant speed holding device.
Figure 4:
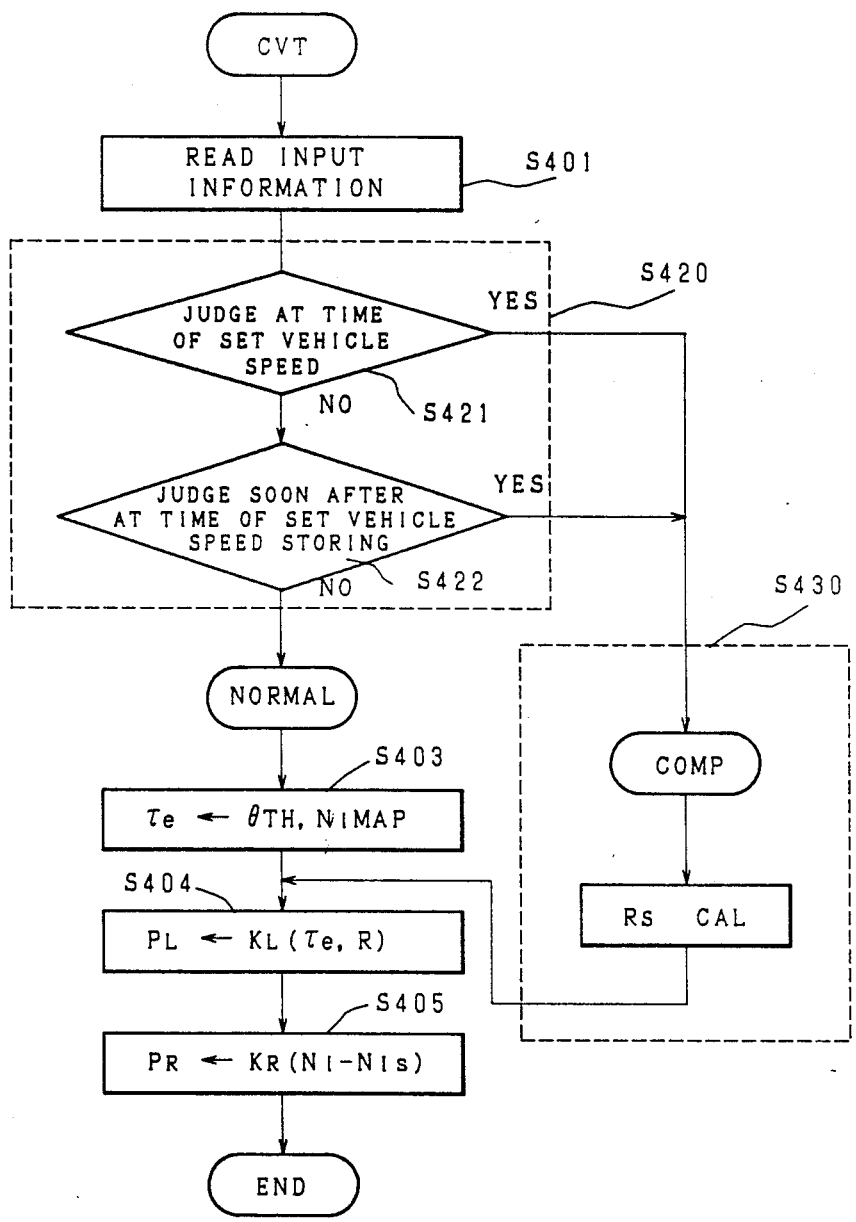
FIG. 4 is a flow chart illustrating the operation of a continuous variable transmission control unit of the constant speed holding apparatus of the invention.

FIG. 4 is a flow chart illustrating the sequence of operations of the continuous variable transmission control unit of the constant speed holding device according to the invention. In the case of normal run, the sequence of control for the continuous variable transmission 250 is such that at step S401, various input data, such as input shaft rotation speed data $N_I$ from the input rotation angle sensor 211, output shaft rotation speed data $N_O$ from the output rotation angle sensor 212, the range position signal Sel from the range position sensor 213, and throttle opening data $\theta_{TH}$ from the throttle opening sensor 214, are read by the continuous variable transmission control device 200 in same way as in the FIG. 2 case.

Then, processing advances to step S420, a vehicle speed stored time determining routine, and at step S421, a decision is made as to whether or not at the time of set vehicle speed storing on the basis of the operation of the command switches 120 by the driver; if no, a decision is made at next step S422 as to whether or not it is immediately after set vehicle speed storing; and if no again, processing advances to step S403. At step S403, the continuous variable transmission control unit 200 calculates an engine torque $\tau_e$ on the basis of various input data read at step S401. At step S404, a regulated hydraulic pressure value $P_L$ is calculated from both the engine torque $\tau_e$ and the variable speed ratio R. For the purpose of this calculation a map is used.

Whilst, at step S405, a variable speed hydraulic pressure calculation routine, calculation is made for a variable speed hydraulic pressure value $P_R$ corresponding to the difference between the target input shaft rotation speed $N_{IS}$ and the actual input shaft rotation speed $N_I$ ($N_I - N_{IS}$).

The regulating hydraulic pressure actuator 240 is operated according to the regulated hydraulic pressure value $P_L$ thus calculated, and at same time the variable speed hydraulic pressure actuator 241 is operated according to the variable speed hydraulic pressure value $P_R$.

Thus, by means of the regulating hydraulic pressure actuator 240 and the variable speed hydraulic pressure actuator 241, variable speed ratio control of the continuous variable transmission 250 is performed.

Next, in step S421, operation of the set switch 121 by a driver allows the vehicle speed memory device 102 store the target vehicle speed value, and at the storing time or at the step S422, condition setting time detecting device 107 detects the time point when, immediately after the storing, the opening degree of throttle stabilizes, and then processing advances to step S430, variable speed ratio correction routine, detecting output being sent from the condition setting time detecting device 107 to the correction device 204.

In the variable speed ratio correction routine at this step S430, at the time of inputting of the target vehicle speed memory signal from the driver or at the immediately following specified period of time in which the throttle opening becomes stabilized, calculation of the variable speed ratio is so made that an immediately preceding variable speed ratio agrees with a target variable speed ratio $R_S$, and via steps S404 and S405, variable speed ratio control of the continuous variable transmission 250 is carried out, with the immediately preceding variable speed ratio taken as a target variable speed ratio. Thus, by manipulating the set switch 121, it is possible to correct any possible overshoot or undershoot trouble with the vehicle speed right after the target vehicle speed being stored in place.

According to the present invention, as above described, a point of time at which a target vehicle speed value is stored in place by the driver's manipulating the command switches, or a specified period immediately following the time, is detected by the conditions set time detecting device, and the target variable speed ratio detected at the period of time is so compensated by the correction device as to be in agreement with the variable speed ratio at an immediately preceding point of time.

Thus, the variable speed cruise performance of the vehicle is not subject to the influence of variable speed ratio control, and accordingly the trouble of such overshoot or undershoot as has hitherto been noticeably seen with the vehicle speed at the time of a target speed value storing or in a period of time immediately following such time can be reasonably minimized, whereby improving constant speed cruise feeling.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A constant speed holding apparatus comprising;
    a vehicle speed sensor which outputs a signal indicating an actual vehicle speed;
    a cruise conditions setting means for setting cruise conditions including a target vehicle speed to be maintained;
    a cancellation conditions detecting means for detecting conditions for cancellation of said cruise conditions;
    a throttle actuator for controlling a throttle opening of an engine;
    a constant speed cruise control means for driving said throttle actuator to perform constant speed cruise control in order to maintain said target vehicle speed on the basis of the signal outputted from said vehicle speed sensor and indicating the actual vehicle speed and of the cruise conditions set by said cruise conditions setting means;
    a condition set time detecting means for detecting a point of time at which the cruise conditions are set by said cruise conditions setting means or a specific period of time thereafter;
    a continuous variable transmission disposed in a power train for power transmission from said engine;
    a cruise information detecting means for detecting cruise information including said throttle opening; and
    a continuous variable transmission controlling means performing variable speed ratio control of said continuous variable transmission to maintain said target cruise speed on the basis of said cruise information detected by said cruise information detecting means, said continuous variable transmission controlling means maintaining said variable speed ratio at a target variable speed ratio, and, upon detection of the time of said cruise conditions setting or the specified period of time after said setting, the variable speed, ratio immediately prior to the detected time being taken as said target variable speed ratio.

2. A constant speed holding apparatus as set forth in claim 1, wherein said constant speed cruise control means comprises:
    a vehicle speed memory means for storing therein the target vehicle speed set by said cruise conditions setting means;
    a speed signal generating means generating a speed signal corresponding to said cruise conditions;
    a cancellation signal generating means generating a signal for canceling the operation of said throttle actuator on the basis of the detected result by said cancellation conditions detecting means;
    a logic operation means performing a predetermined logic operation on the basis of the outputs of said vehicle speed sensor, said vehicle speed memory means, said speed signal generating means, and said cancellation signal generating means; and
    an actuator drive means for controlling the throttle opening of said throttle actuator on the basis of the output of said logic operation means.

3. A constant speed holding apparatus as set forth in claim 2, wherein said conditions set time detecting means detects the time at which the conditions are set or the specified period of time thereafter on the basis of the outputs of said logic operation means and said actuator drive means.

4. A constant speed holding apparatus as set forth in claim 1, wherein said continuous variable transmission control means comprises:
    a regulating hydraulic pressure generating means outputting a signal for generating a regulating hydraulic pressure for adjusting the transmission power of said continuous variable transmission corresponding to the driving power of said engine;
    a variable speed hydraulic pressure generating means outputting a signal for generating variable speed hydraulic pressure for controlling the variable speed ratio of said continuous variable transmission;
    a continuous variable transmission regulating means for regulating said regulating hydraulic pressure and said variable speed hydraulic pressure acting on said continuous variable transmission on the basis of signals outputted from said regulating hydraulic pressure generating means and said variable speed hydraulic pressure generating means; and
    a correction means, for maintaining said target variable speed ratio, and upon detecting said conditions set time or the specified period of time thereafter, the variable speed ratio of said continuous variable transmission immediately prior to said detection being taken as said target variable speed ratio.

* * * * *